United States Patent [19]
Amer et al.

[11] 3,784,319
[45] Jan. 8, 1974

[54] CORIOLIS-RELIEVING AIRCRAFT ROTOR ASSEMBLY

[75] Inventors: Kenneth B. Amer, Los Angeles; Howard T. Lund, Playa Del Ray, both of Calif.

[73] Assignee: Summa Corporation, Culver City, Calif.

[22] Filed: Apr. 17, 1972

[21] Appl. No.: 244,427

[52] U.S. Cl. ............................ 416/135, 416/148
[51] Int. Cl. ............................................. B64c 27/52
[58] Field of Search ............... 416/131, 135, 127, 416/102, 148

[56] References Cited
UNITED STATES PATENTS

| | | | |
|---|---|---|---|
| 2,499,314 | 2/1950 | Hunt | 416/131 |
| 2,961,051 | 11/1960 | Wilford et al. | 416/131 X |
| 3,026,942 | 3/1962 | Cresap | 416/135 X |
| 3,087,690 | 4/1963 | Doman et al. | 416/102 X |
| 3,156,302 | 11/1964 | Jordan | 416/148 |
| 3,193,019 | 7/1965 | Drees et al. | 416/102 X |
| 3,637,321 | 1/1972 | Nekrasov et al. | 416/131 X |
| 3,667,863 | 6/1972 | Breuner | 416/135 UX |
| 3,700,351 | 10/1972 | Flux | 416/198 X |

FOREIGN PATENTS OR APPLICATIONS

| | | | |
|---|---|---|---|
| 726,828 | 3/1932 | France | 416/135 |
| 247,395 | 5/1912 | Germany | 416/135 |
| 752,220 | 7/1956 | Great Britain | 416/135 |

*Primary Examiner*—Everette A. Powell, Jr.
*Attorney*—Jess M. Roberts et al.

[57] ABSTRACT

In a multiple blade tail rotor of a helicopter, cyclic Coriolis forces are cushioned by resilient stress-absorbing means interposed between the engine output member and the pairs of trunnions on the teetering axes of the blade hubs to permit the pairs of trunnions to oscillate relative to each other and relative to the engine output member.

13 Claims, 7 Drawing Figures

3,784,319

CORIOLIS-RELIEVING AIRCRAFT ROTOR ASSEMBLY

BACKGROUND OF THE INVENTION

In a relatively simple helicopter tail rotor assembly a single pair of diametrically opposite blades are mounted on a common hub that is formed with a pair of trunnions and the pair of trunnions define a teetering axis that is at an acute angle to the axis of the blades. Such a two-bladed teetering blade rotor is both simple and reliable. It does not require bearings which must oscillate on each revolution of the rotor and at the same time carry the full centrifugal force of the blades. In addition, it relieves the potentially powerful "Coriolis" torques merely by deflection of its drive system in torsion twice on each revolution of the rotor.

The trend, however, is toward multiple-bladed teetering tail rotors in which two or more pairs of diametrically opposite blades are mounted corresponding pairs of trunnions for rotation in spaced planes with the multiple blades actuated by a common drive shaft. Unfortunately, since the cyclic Coriolis torques created by the pairs of blades are out of phase with each other, such a drive system is incapable of inherently relieving the torques.

An example is a teetering tail rotor wherein two pairs of diametrically opposite blades are mounted on two corresponding pairs of trunnions with the pairs of blades at an angle relative to each other of 60° or 90°. Whenever the rotor experiences first harmonic flapping, one of the pairs of blades tries to speed up at the same instant in time that the other pair of blades tries to slow down. Thus, the two pairs of blades try to move cyclically like a pair of scissors and the consequent high magnitude stresses occurring twice on each revolution are concentrated in a short portion of the common drive shaft. If these powerful stresses are not relieved, the drive shaft may fatigue to the point of structural failure.

SUMMARY OF THE INVENTION

The problem of Coriolis relief in a multiple-blade tail rotor is solved by interposing resilient stress-absorbing means between the engine output and each of the pairs of trunnions of the hub assembly.

In one embodiment of the invention under this generic concept, the hub assembly of the rotor has a base portion that is fixed to the drive shaft and a pair of arms integral with the base portion extend on opposite sides of the shaft from the base portion to each of the multiple pairs of trunnions. The base portion of the hub assembly is relatively rigid but the integral pairs of arms are relatively flexible to permit the individual pairs of trunnions to oscillate relative to each other and relative to the common drive shaft. The pairs of arms provide sufficient torsional resiliency to reduce the cyclic Coriolis torques to non-destructive levels while possessing sufficient strength to transmit the maximum driving torques as well as to carry other static and dynamic loads.

This first embodiment of the invention has the simplicity of a two-bladed teetering rotor in that no once-per-revolution cyclic blade pitch change occurs since the pitch control arms are located on the teetering axis. Two pairs of diametrically opposite blades on a single drive shaft do not require any additional bearings or mechanical complexity over that required by two rotors each of which has a single pair of diametrically opposite blades.

The hub assembly of a second embodiment of the invention also has a base portion with pairs of arms extending therefrom to corresponding pairs of trunnions but in this instance the pairs of arms are relatively rigid but the base portion is of yielding construction to permit the rigid arms to oscillate in response to cyclic Coriolis forces. Thus, the rigid arms tilt as required for independent oscillation of the pairs of trunnions relative to the drive shaft on which the hub assembly is mounted.

The yielding base portion of the hub assembly includes a hub with a diametrical pair of integral spokes extending radially from the hub. Two relatively rigid structures are integral with the outer ends of the two spokes respectively and the two rigid structures are integrally interconnected by two webs with the two rigid structures and the two webs extending continuously circumferentially around the hub structure. With the blades of the rotor mounted on two pairs of trunnions, each of the rigid portions of the hub assembly is connected to one trunnion of each of the two pairs. The two spokes are resiliently yieldable in torsion and the two interconnecting webs are resiliently flexible to permit the two rigid portions of the hub assembly to rock oppositely relative to each other for oscillation of the two pairs of trunnions relative to each other and relative to the shaft on which the hub assembly is mounted.

A third embodiment of the invention is a rotor which two pairs of diametrically opposite blades mounted on two corresponding trunnions that are driven by two corresponding shafts in the form of a pair of concentric torque tubes. Each of the concentric torque tubes flexes resiliently in torque to permit the pair of trunnions thereon to oscillate independently relative to the engine output member to which both torque tubes are connected.

The features and advantages of the invention may be understood from the following detailed description and the accompanying drawings.

BRIEF DESCRIPTION OF THE DRAWINGS

In the drawings, which are to be regarded as merely illustrative.

DESCRIPTION OF THE PREFERRED EMBODIMENTS OF THE INVENTION

Figure 1:
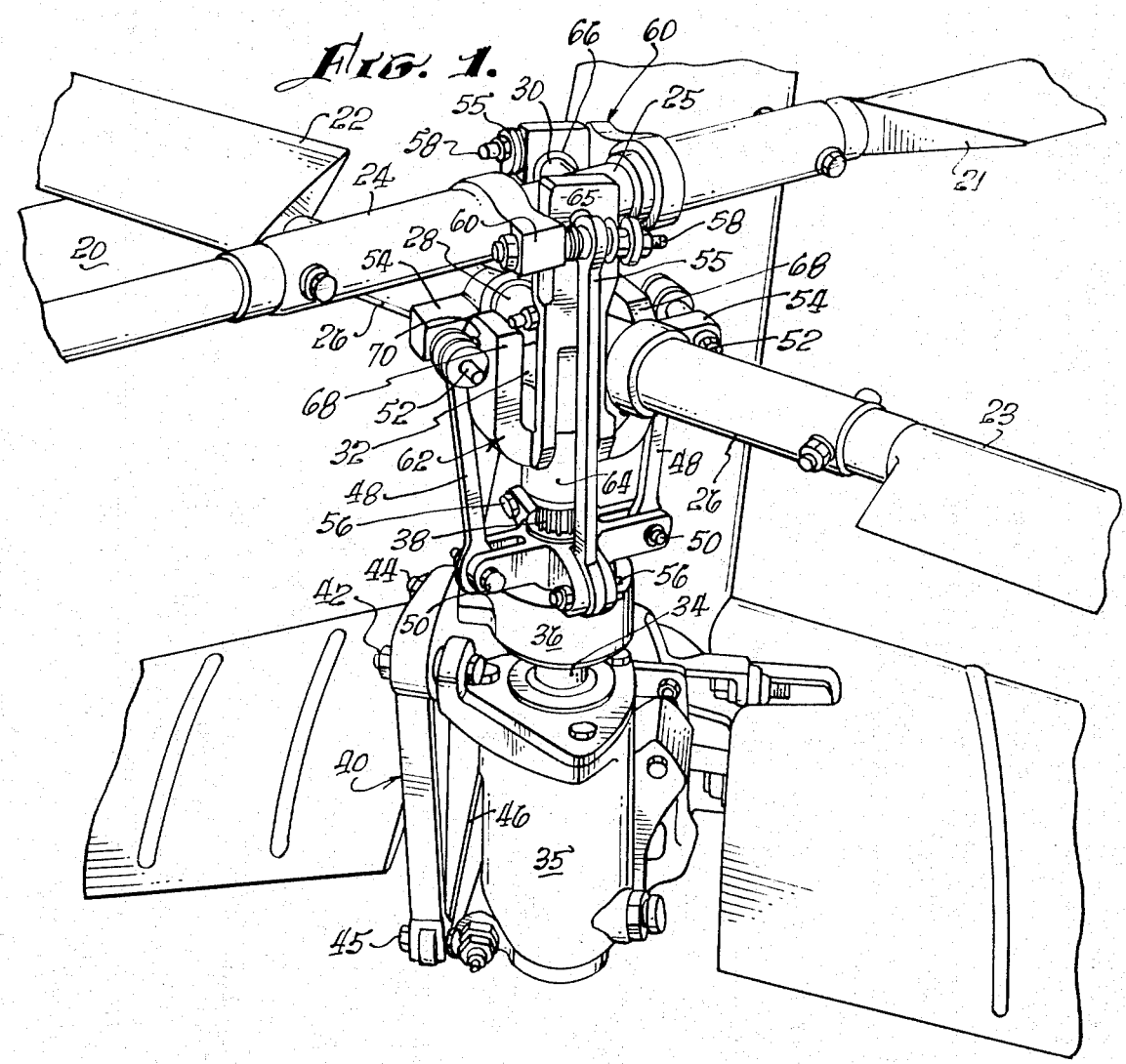
FIG. 1 is a fragmentary perspective view illustrating the first embodiment of the invention.

In the embodiment of the invention shown in FIG. 1, a tail rotor of a helicopter has a pair of diametrically opposite blades 20 and 21 in an outer plane of rotation and a second pair of diametrically opposite blades 22 and 23 rotating in an inner plane. In a well known manner the roots or shanks of the two blades 20 and 21 are mounted in a corresponding diametrically opposite tubular shanks 24 of a hub 25 with the two blades rotatable about their axes as required for changes in pitch. In like manner the two blades 22 and 23 are rotatably mounted in the tubular shanks 26 of a hub 28. The two pairs of blades are positioned at an angle relative to each other with the consequency that the cyclic Coriolis torques created by the two pairs of blades are out of phase with each other.

The hub 25 that carries the two outer blades 20 and 21 is formed with a pair of opposite trunnions 30 by means of which it is mounted to teeter about a transverse axis that is non-perpendicular to the pitch axis of the two blades. In like manner the hub 28 that carries the inner pair of blades 22 and 23 is formed with a pair of opposite trunnions 32.

The two pairs of blades are mounted on a common engine output member in the form of a drive shaft 34 that is journaled in a gearcase 35 and a well known mechanism is provided for changing the pitch of the four blades by remote control. In the construction shown, the pitch control mechanism includes the usual swashplate 36 that is slidable on a splined portion 38 of the drive shaft 34 and the swashplate is controlled by a bell crank 40 that is mounted by a pivot 42 on the gearcase 35. One arm of the bell crank 40 is connected to the swashplate 36 by pivot means 44 and the second arm of the bell crank is connected by pivot means 45 to a control rod 46.

A pair of relatively short links 48 are connected at their inner ends to the swashplate 36 by corresponding pivots 50 and at their outer ends are connected by pivots 52 to corresponding pitch control arms 54 of the two blades 22 and 23, respectively. In like manner a pair of relatively long links 55 are connected to the swashplate by corresponding pivots 56 with the outer ends of the links connected by pivots 58 to pitch control arms 60 of the two outer blades 20 and 21, respectively. The two pitch control arms 60 are shown in FIG. 1.

Figure 2:
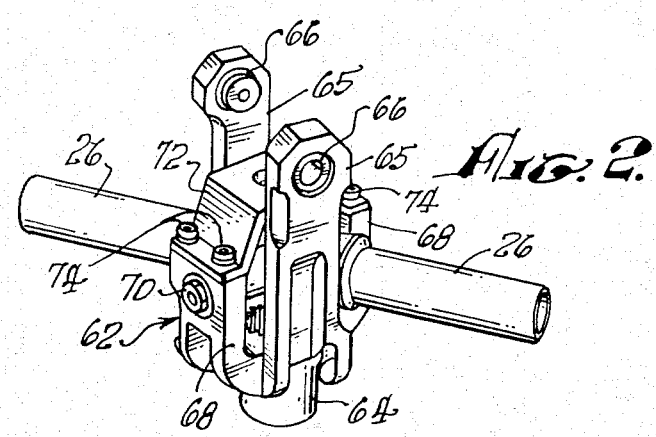
FIG. 2 is a perspective view of a hub structure that is employed in the first embodiment of the invention.

The structure in FIG. 1 described to this point is more or less conventional and taught by the prior art. The novel feature of this first embodiment of the invention is a hub structure, generally designated 62, that is best shown in FIG. 2 and which serves as means for pivotally mounting the two pairs of trunnions 30 and 32 on the drive shaft 34. The hub structure 62 has a base portion 64 which is keyed to the drive shaft 34 and has two pairs of integral arms comprising a relatively long pair 65 equipped with self-aligning bearings 66 to journal the pair of trunnions 30 of the pair of blades 20 and 21 and a relatively short pair of arms 68 with similar bearings 70 to journal the trunnions 32 of the pair of blades 22, 23. Both of the pairs of arms are of adequate strength to drive the rotor blades but nevertheless at least one of the two pairs of arms is sufficiently resilient to flex in response to the cyclic Coriolis forces and thus serve as stress-absorbing means to avoid excessive stessing of the drive shaft. In this instance, both of the pairs of arms 65 and 68 are resiliently flexible to permit oscillation of the two pairs of trunnions 30 and 32 relative to each other and relative to the drive shaft 34. As shown in FIG. 2, the ends of the pair of shorter arms 68 may be interconnected by an angular plate 72.

Figure 5:
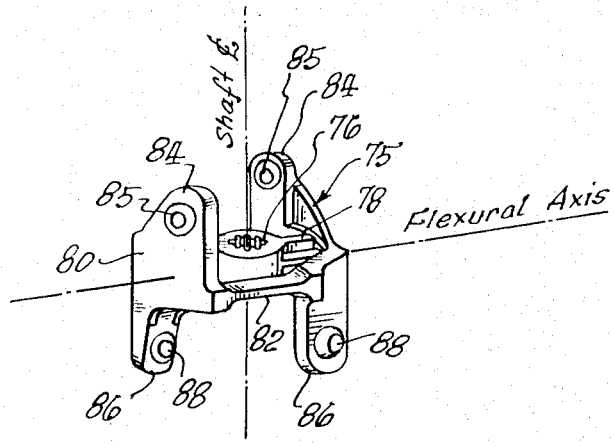
FIGS. 3, 4, and 5 are perspective views of a hub structure employed in a second embodiment of the invention.
Figure 4:
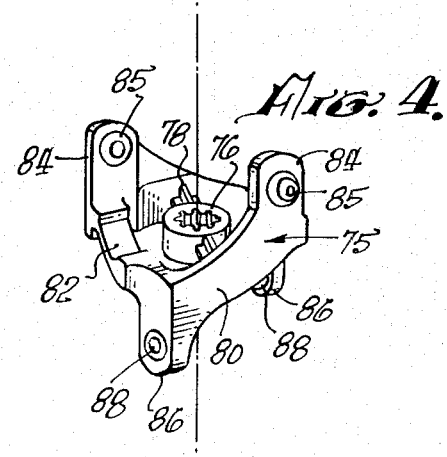
Figure 3:
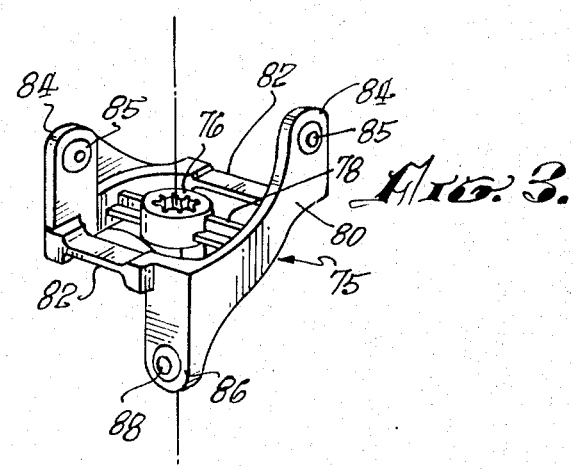

A second embodiment of the invention incorporates a hub structure, generally designated 75 in FIGS. 3, 4, and 5 which is substituted for the hub structure 62 of the first embodiment of the invention. In most other respects the second embodiment is largely identical to the first embodiment.

The hub structure 75 has a central base portion 76 in the form of a hub that is keyed to the drive shaft 34. Integral with the base portion or hub 76 is a pair of diametrically opposite radial spokes 78 which preferably are of noncircular cross-sectional configuration as shown. Integral with the outer ends of the two spokes 78 respectively are rigid portions 80 of the hub structure and the two rigid portions 80 are integrally interconnected by relatively thin webs 82 of metal, the two rigid portions and the two webs being continuous around the circumference of the hub structure. Each of the two rigid portions 80 of the hub structure has an upwardly extending arm 84 equipped with a self-aligning bearing 85 to journal one of the upper trunnions 30 and has a second similar donwardly extending arm equipped with a self-aligning bearing 88 to journal a corresponding one of the pair of lower trunnions 32.

The two pairs of arms 84 and 86 are rigid, being rigid parts of the two rigid portions 80 of the hub structure but the base portion of the hub structure comprising the pair of spokes 78 and the pair of thin webs 82 is resiliently yieldable to permit the arms to tilt as required for oscillation of the two pairs of trunnions relative to each other and relative to the drive shaft 34. The resilience of the base portion of the hub structure is provided in part by resilience in torque of the two spokes 78 and in part by resilience in flexure of the two thin webs 82. Thus, to permit oscillation of the upper pair of bearings 85 relative to the lower pair of bearings 88 and to permit oscillation of both pairs of bearings relative to the hub 76, the two spokes 78 yield oppositely in torque to permit the two rigid portions 80 of the hub structure to rock in opposite directions and the two thin webs 82 bow in a resilient manner to accommodate the opposite rocking of the two rigid portions 80.

Figure 6:
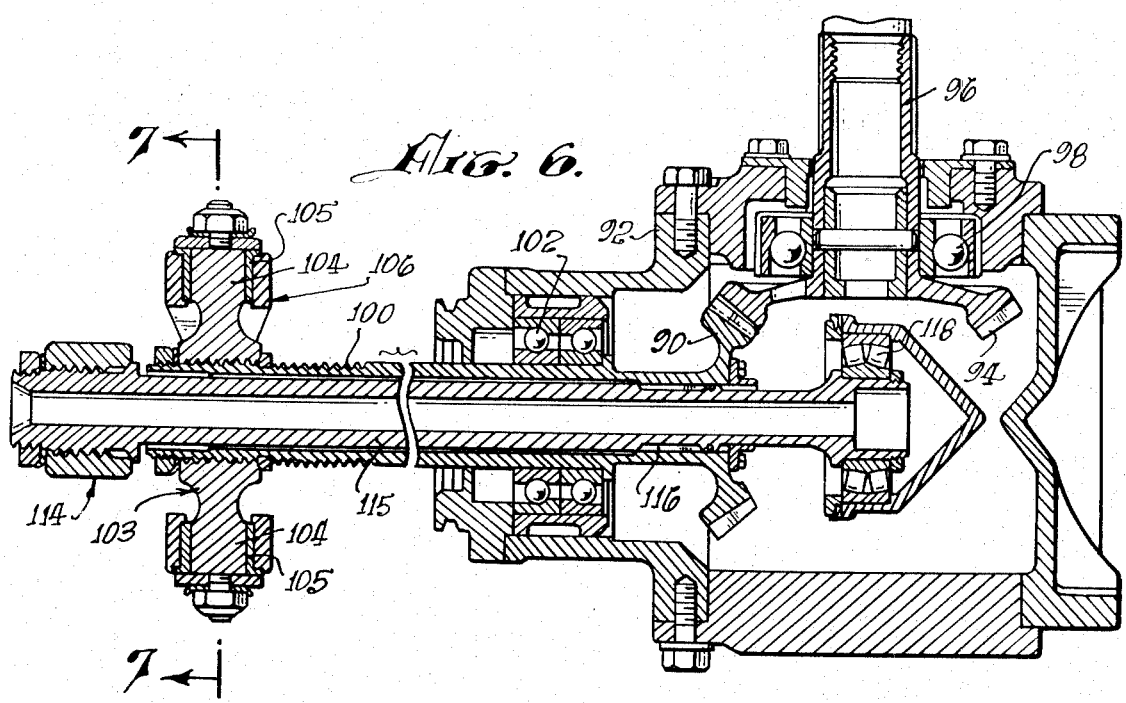
FIG. 6 is a fragmentary section illustrating a third embodiment of the invention.
Figure 7:
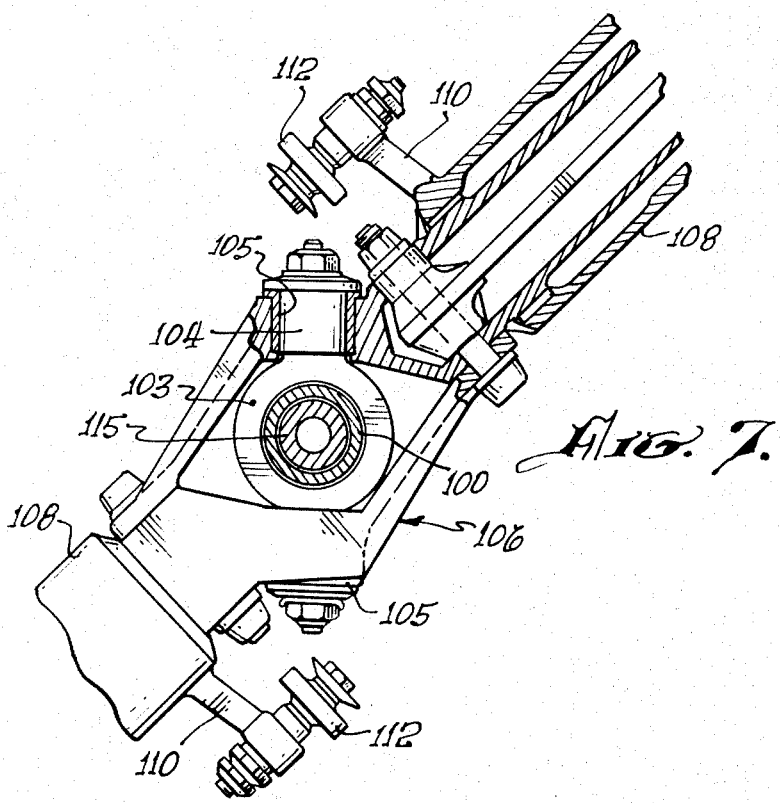
FIG. 7 is a transverse section taken as indicated by the line 7 — 7 of FIG. 6.

The construction of the third embodiment of the invention may be understood by reference to FIGS. 6 and 7.

In FIG. 6 the engine output member to which the two pairs of trunnions are connected in a bevel gear 90 in a fixed casing 92, the bevel gear being actuated by a second bevel gear 94 on an engine-driven shaft 96 that is journaled in a bearing 98. The bevel gear 90 is unitary with an outer tubular drive shaft 100 that is journaled in a bearing 102. The outer end of the outer tubular shaft 100 is provided with a collar 103 that forms a pair of diametrically opposite trunnions 104 which are journaled in corresponding bearing sleeves 105 of a hub 106 that carries a pair of diametrically opposite rotor blades 108 (FIG. 7). Each of the two blades 108 has the usual pitch control arm 110 that is operated by a corresponding link 112. The pair of diametrically opposite blades 108 rotate in an inner plane and a second pair of diametrically opposite blades (not shown) rotate in an outer plane.

The second pair of diametrically opposite blades are mounted on trunnions (not shown) that are formed by a collar 114 that is unitary with an inner tubular drive shaft 115. The inner tubular shaft 115 is concentric to the outer tubular shaft 100 and is fixedly interlocked with the outer tubular shaft by mutually engaged splines 116 on the two shafts near the inner ends thereof. The inner end of the inner tubular shaft 115 is journaled in a thrust bearing 118 inside the casing 92.

It is apparent that both of the two tubular shafts 100 and 115 are fixedly connected at their inner ends to the engine output member or bevel gear 90 and it is further apparent that both function as resilient torque tubes which may yield in torque independently of each other in response to the cyclic Coriolis forces. Thus, the two torque tubes permit the two pairs of trunnions to oscillate relative to each other and relative to the bevel gear 90.

Our description in specific detail of the selected embodiments of the invention will suggest various changes, substitutions, and other departures from our disclosure within the spirit and scope of the appended claims.

What is claimed is:

1. An aircraft rotor structure comprising:
   at least two pairs of diametrically opposite blades;
   an engine output member;
   at least two pairs of trunnions rotationally driven by the engine output member with each pair of diametrically opposite blades pivoted on a trunnion pair for teetering movement, and
   stress absorbing means interposed between the output member and the pairs of trunnions to permit relative rotational movement between the trunnion pairs in relieving coriolis forces resulting from the teetering movement of the diametrically opposite blades.

2. The aircraft rotor structure of claim 1 wherein the means providing relative rotational movement between the trunnion pairs permits relative rotational movement between each of the trunnion pairs and the engine output member.

3. The aircraft rotor structure of claim 1 wherein said means to permit relative rotational movement between the trunnion pairs includes:
   a hub having a base portion which is relatively rigid;
   said base portion being connected directly to the engine output member;
   arms formed integrally with the base portion with an arm extending from the base portion to each trunnion pair;
   each arm having sufficient strength to transmit rotational movement from said base portion to a trunnion pair to provide rotational movement of the diametrically opposite blades pivotally connected to the trunnion pair, and
   at least one arm being sufficiently resilient to permit relative rotational movement of the trunnion pair to which the arm is connected with respect to the axis of the engine output member,
   whereby relative rotational movement between the trunnion pairs is permitted and also relative rotational movement of at least one trunnion pair with respect to the axis of the engine output member in reducing the transmission of coriolis forces to the engine output member.

4. The aircraft rotor structure of claim 3 wherein the connection of each arm to a trunnion pair is transverse to the plane within which the diametrically opposite blades teeter with respect to the trunnion pair.

5. The aircraft rotor structure of claim 3 wherein each arm is sufficiently resilient to permit relative rotational movement of each trunnion pair relative to the axis of the engine output member.

6. The aircraft rotor structure of claim 4 wherein each arm is sufficiently resilient to permit relative rotational movement of each trunnion pair relative to the axis of the engine output member.

7. The aircraft rotor structure of claim 3 wherein a pair of arms extends from the base portion to each trunnion pair.

8. The aircraft rotor structure of claim 7 wherein the connections of each pair of arms to each trunnion pair are transverse to the plane within which the diametrically opposite blades teeter with respect to the trunnion pair.

9. The aircraft rotor structure of claim 1 wherein the means providing relative rotational movement between the trunnion pairs includes:
   a hub structure having a base portion driven by the output member and a pair of arms unitary with the base portion extending from the base portion to two trunnion pairs positioned on opposite sides of the axis of the output member,
   said arms being relatively rigid, and
   said base portion having sufficient strength to transmit rotational movement to the trunnion pairs but being resiliently deformable to allow the two arms to tilt relative to the axis of the output member to permit the trunnion pairs to undergo relative rotational movement and for each trunnion pair to undergo relative rotational movement with respect to the output member.

10. The aircraft rotor structure of claim 9 in which the base portion of the hub structure has a central hub with diametrically opposite radial spokes unitary therewith;
    the two relatively rigid arms being unitarily joined to the outer ends respectively of the two spokes;
    each of the two rigid arms connecting one trunnion of one trunnion pair with one trunnion of the other trunnion pair;
    a flexible web interconnecting the two rigid arms;
    said spokes being resilient to torsional forces, and
    said web being resilient to bending forces,
    whereby the rigid arms are permitted to rock with respect to the central hub in providing relative rotational movement between the trunnion pairs and relative rotational movement of each trunnion pair with respect to the output member.

11. The aircraft rotor structure of claim 1 wherein said means to permit relative rotational movement between the trunnion pairs includes:
    a first inner drive shaft and a second outer tubular drive shaft surrounding the inner drive shaft and concentric thereto;
    the two shafts being united with the output member at their inner ends and extending from the output member;
    each of the two shafts being connected at its outer end to a trunnion pair, and
    at least one of said shafts being resilient to torsional forces to permit relative rotational movement between the trunnion pairs in relieving coriolis forces resulting from teetering movement of the diametrically opposite blades.

12. The aircraft rotor structure of claim 11 wherein each of the drive shafts is resilient in torsion to permit each trunnion pair to undergo rotational movement relative to the other trunnion pair.

13. The aircraft rotor of claim 10 wherein the two drive shafts are concentric torque tubes.

* * * * *

UNITED STATES PATENT OFFICE
CERTIFICATE OF CORRECTION

Patent No. 3,784,319            Dated January 8, 1974

Inventor(s) Kenneth B. Amer et al

It is certified that error appears in the above-identified patent and that said Letters Patent are hereby corrected as shown below:

The names of the joint inventors should read as follows:

Kenneth B. Amer; and Herbert T. Lund

Signed and sealed this 30th day of July 1974.

(SEAL)
Attest:

McCOY M. GIBSON, JR.
Attesting Officer

C. MARSHALL DANN
Commissioner of Patents